United States Patent
Arao

(10) Patent No.: US 10,205,361 B2
(45) Date of Patent: Feb. 12, 2019

(54) LINEAR SOLENOID

(71) Applicant: DENSO CORPORATION, Kariya, Aichi-pref. (JP)

(72) Inventor: Masashi Arao, Kariya (JP)

(73) Assignee: DENSO CORPORATION, Kariya (JP)

( * ) Notice: Subject to any disclaimer, the term of this patent is extended or adjusted under 35 U.S.C. 154(b) by 246 days.

(21) Appl. No.: 15/220,499

(22) Filed: Jul. 27, 2016

(65) Prior Publication Data

US 2017/0033628 A1 Feb. 2, 2017

(30) Foreign Application Priority Data

Jul. 28, 2015 (JP) ................................ 2015-148585

(51) Int. Cl.
*H02K 1/34* (2006.01)
*H02K 5/04* (2006.01)
*H02K 3/04* (2006.01)
*H01F 7/16* (2006.01)

(52) U.S. Cl.
CPC ............ *H02K 1/34* (2013.01); *H01F 7/1607* (2013.01); *H02K 3/04* (2013.01); *H02K 5/04* (2013.01)

(58) Field of Classification Search
CPC ... H02K 1/34; H02K 3/04; H02K 5/04; H01F 7/1607
USPC .......................................................... 310/14
See application file for complete search history.

(56) References Cited

U.S. PATENT DOCUMENTS

| 6,955,336 | B2 * | 10/2005 | Bircann | H01F 7/1607 251/129.15 |
|---|---|---|---|---|
| 8,368,493 | B2 * | 2/2013 | Murao | H01F 7/081 335/255 |
| 8,957,749 | B2 * | 2/2015 | Matsumoto | H01F 7/1638 335/255 |
| 2002/0104977 | A1 * | 8/2002 | Bircann | H01F 7/1607 251/129.15 |
| 2007/0152790 | A1 * | 7/2007 | Telep | H01F 7/13 335/255 |
| 2009/0200502 | A1 * | 8/2009 | Hoppe | F01L 1/34 251/129.15 |
| 2011/0210277 | A1 * | 9/2011 | Bender | F16K 31/06 251/129.01 |
| 2011/0285484 | A1 * | 11/2011 | Hoppe | H01F 7/081 335/229 |
| 2012/0199086 | A1 * | 8/2012 | Hori | F01L 1/3442 123/90.17 |

(Continued)

FOREIGN PATENT DOCUMENTS

| JP | 2015-60952 | 3/2015 |
|---|---|---|
| JP | 2015-158194 | 9/2015 |

*Primary Examiner* — Alex W Mok
(74) *Attorney, Agent, or Firm* — Nixon & Vanderhye P.C.

(57) ABSTRACT

A flange part is formed in a shape whose diameter increases toward an outer diameter side of a center core. The flange part closes a space between an end of a magnetic delivery core on a second side in the axial direction and an end of the center core on the second side in the axial direction. An output member includes a contact part, which is brought into contact with an end of the center core on a first side in the axial direction when a plunger moves toward the second side in the axial direction. When the contact part is brought into contact with the end of the center core on the first side in the axial direction, the plunger defines an axial clearance between the plunger and the flange part.

5 Claims, 8 Drawing Sheets

(56) References Cited

U.S. PATENT DOCUMENTS

| | | | |
|---|---|---|---|
| 2012/0242436 A1* | 9/2012 | Murao | H01F 7/081 335/255 |
| 2013/0009083 A1* | 1/2013 | Ozaki | F16K 31/0655 251/129.15 |
| 2014/0028422 A1* | 1/2014 | Matsumoto | H01F 7/1638 335/282 |
| 2014/0028423 A1* | 1/2014 | Matsumoto | H01F 7/1607 335/282 |
| 2015/0076930 A1 | 3/2015 | Kondo | |
| 2015/0077204 A1 | 3/2015 | Kondo | |

* cited by examiner (FRONT) ONE END SIDE ← AXIAL DIRECTION → (REAR) THE OTHER END SIDE

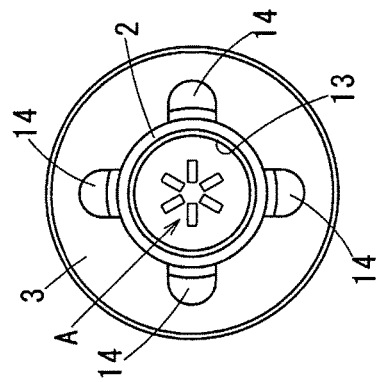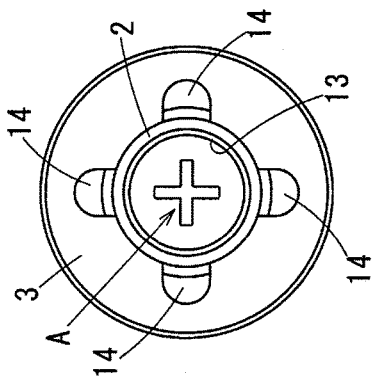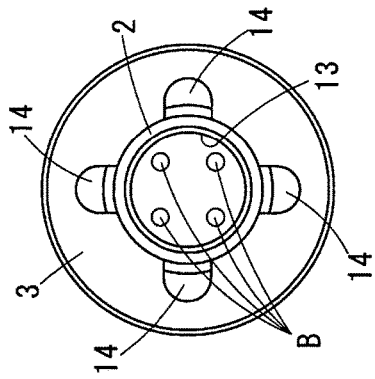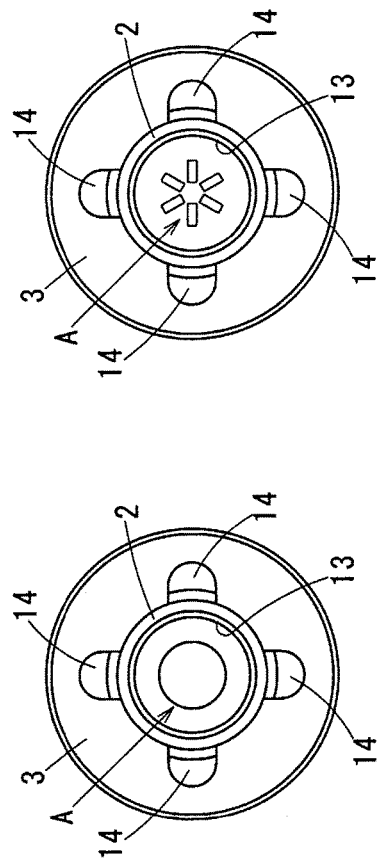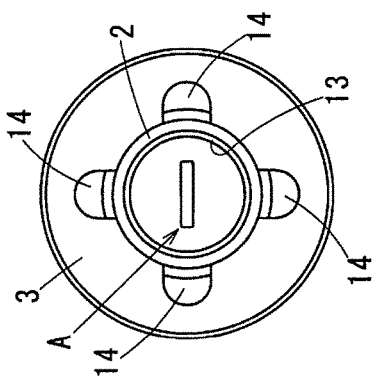

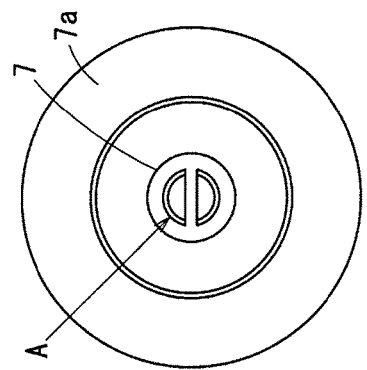
FIG. 8A
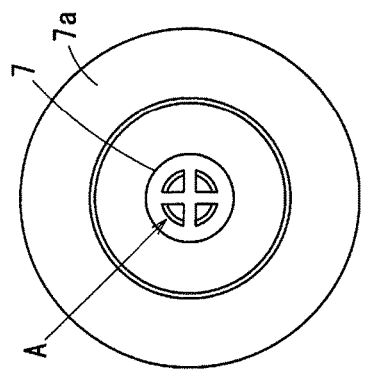
FIG. 8B
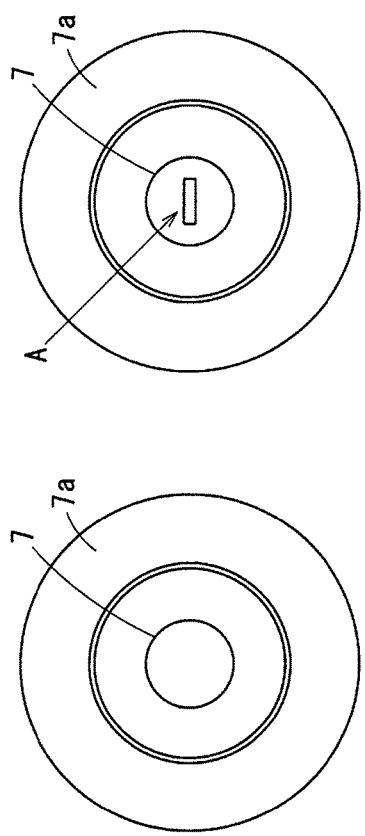
FIG. 8C
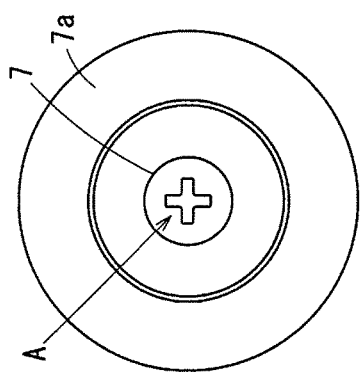
FIG. 8D
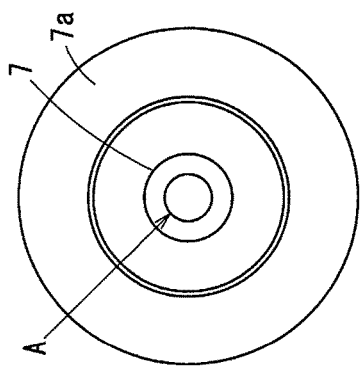
FIG. 8E
FIG. 8F

LINEAR SOLENOID

CROSS REFERENCE TO RELATED APPLICATION

This application is based on Japanese Patent Application No. 2015-148585 filed on Jul. 28, 2015, the disclosure of which is incorporated herein by reference.

TECHNICAL FIELD

The present disclosure relates to a linear solenoid that produces driving force in an axial direction.

BACKGROUND

The linear solenoid described in, for example, JP2015-84395A is known for a linear solenoid that generates driving force in the axial direction. The linear solenoid in JP2015-84395A includes a cylindrical plunger that is supported movably in the axial direction. This plunger is disposed inward of a cylindrical magnetic delivery core, and is disposed outward of a columnar center core.

The space between the other axial end of the magnetic delivery core and the other axial end of the center core is closed by a flange part that is provided at the center core. Thus, the volume of space surrounded with the magnetic delivery core, the center core, the plunger, and the flange part needs to be change to displace the plunger in the axial direction. Explanation will be given below with this space referred to as a first space. In JP2015-84395A, a breathing passage that communicates in the axial direction is provided for the plunger to enable the volume change of the first space.

Specifically, the plunger in JP2015-84395A includes a generally cylindrical bushing inward thereof. This bushing is supported slidably by the outer peripheral surface of the plunger. A flange-shaped increased diameter part that spreads toward the outer diameter side is provided integrally with the bushing disclosed in JP2015-84395A at the other axial end of the bushing. When the plunger is displaced toward the other axial end, this increased diameter part is brought into contact with the flange part to function as a stopper for restricting the displacement of the plunger toward the other axial end.

Despite the above, as a first issue, the increased diameter part blocks the inside of the breathing passage. The responsiveness of the plunger accordingly deteriorates.

As a second issue, the contact area between the increased diameter part and the flange part is large when the increased diameter part is in contact with the flange part. The large contact area between the increased diameter part and the flange part causes a sticking phenomenon at the contact part between the increased diameter part and the flange part at the time of displacement of the plunger toward one axial end. The responsiveness of the plunger accordingly degrades. The sticking phenomenon is a phenomenon in which some time is taken for the fluid to flow into the contact part even though the contact part is quickly separated, thus making difficult the quick separation of the contact part.

In JP2015-84395A, there is proposed an art for limiting the sticking phenomenon by radially forming many grooves at the flange part to make small the contact area between the increased diameter part and the flange part. However, forming many grooves at the flange part causes cost increases. In other words, there is an issue of responsiveness deterioration if many grooves are not formed at the flange part.

SUMMARY

The present disclosure addresses at least one of the above issues. Thus, it is an objective of the present disclosure to provide a linear solenoid that is excellent in responsiveness and that is inexpensive.

To achieve the objective of the present disclosure, there is provided a linear solenoid including a coil, a cylindrical plunger, an output member, a magnetic attraction core, a cylindrical magnetic delivery core, a columnar center core, and a flange part. The coil produces magnetic force upon energization thereof. The plunger is supported movably in its axial direction inward of the coil and includes a breathing passage, which communicates in the axial direction. The output member is fixed at an end of the plunger on a first side in the axial direction. The magnetic attraction core magnetically attracts the plunger in the axial direction due to the magnetic force produced by the coil. The magnetic delivery core gives and receives magnetic flux to and from an outer peripheral surface of the plunger, respectively. The center core gives and receives the magnetic flux to and from an inner peripheral surface of the plunger, respectively. The flange part is provided at an end of the center core on a second side in the axial direction. The second side is an opposite side from the first side in the axial direction. The flange part is formed in a shape whose diameter increases toward an outer diameter side of the center core. The flange part closes a space between an end of the magnetic delivery core on the second side in the axial direction and the end of the center core on the second side in the axial direction. The output member includes a contact part, which is brought into contact with an end of the center core on the first side in the axial direction when the plunger moves toward the second side in the axial direction. When the contact part is brought into contact with the end of the center core on the first side in the axial direction, the plunger defines an axial clearance between the plunger and the flange part.

BRIEF DESCRIPTION OF THE DRAWINGS

The above and other objects, features and advantages of the present disclosure will become more apparent from the following detailed description made with reference to the accompanying drawings. In the drawings:

FIG. 6A is a diagram illustrating the plunger assy viewed from the other axial end-side in which the shape change part is a projecting part or a recessed part whose shape viewed from the axial direction is circular according to the second embodiment;

FIG. 6B is a diagram illustrating the plunger assy viewed from the other axial end-side in which the shape change part includes grooves or streaky projections whose shapes viewed from the axial direction spread radially from the center to an outer diameter side according to the second embodiment;

FIG. 6C is a diagram illustrating the plunger assy viewed from the other axial end-side in which the shape change part is formed into a groove or a streaky projection viewed from the axial direction according to the second embodiment;

FIG. 6D is a diagram illustrating the plunger assy viewed from the other axial end-side in which the shape change part is a groove or a plus-shaped projecting part whose shape viewed from the axial direction intersects in a cross shape according to the second embodiment;

FIG. 6E is a diagram illustrating the plunger assy viewed from the other axial end-side in which the output member includes through holes according to the second embodiment;

FIG. 8A is a diagram illustrating a center core viewed from one axial end-side in a reference example when the shape change part is not provided at the front end of the center core in the second embodiment;

FIG. 8B is a diagram illustrating the center core viewed from one axial end-side in which the shape change part is formed into a groove or a streaky projection viewed from the axial direction according to the third embodiment;

FIG. 8C is a diagram illustrating the center core viewed from the one axial end-side in which the shape change part includes a projecting part whose shape viewed from the axial direction is circular and on which a minus-shaped groove is formed according to the third embodiment;

FIG. 8D is a diagram illustrating the center core viewed from the one axial end-side in which the shape change part is a recessed part or a projecting part whose shape viewed from the axial direction is circular according to the third embodiment;

FIG. 8E is a diagram illustrating the center core viewed from the one axial end-side in which the shape change part is a groove or a plus-shaped projecting part whose shape viewed from the axial direction intersects in a cross shape according to the third embodiment; and FIG. 8F is a diagram illustrating the center core viewed from the one axial end-side in which the shape change part includes a projecting part whose shape viewed from the axial direction is circular and on which a plus-shaped groove is formed according to the third embodiment.

DETAILED DESCRIPTION

Figure 1:
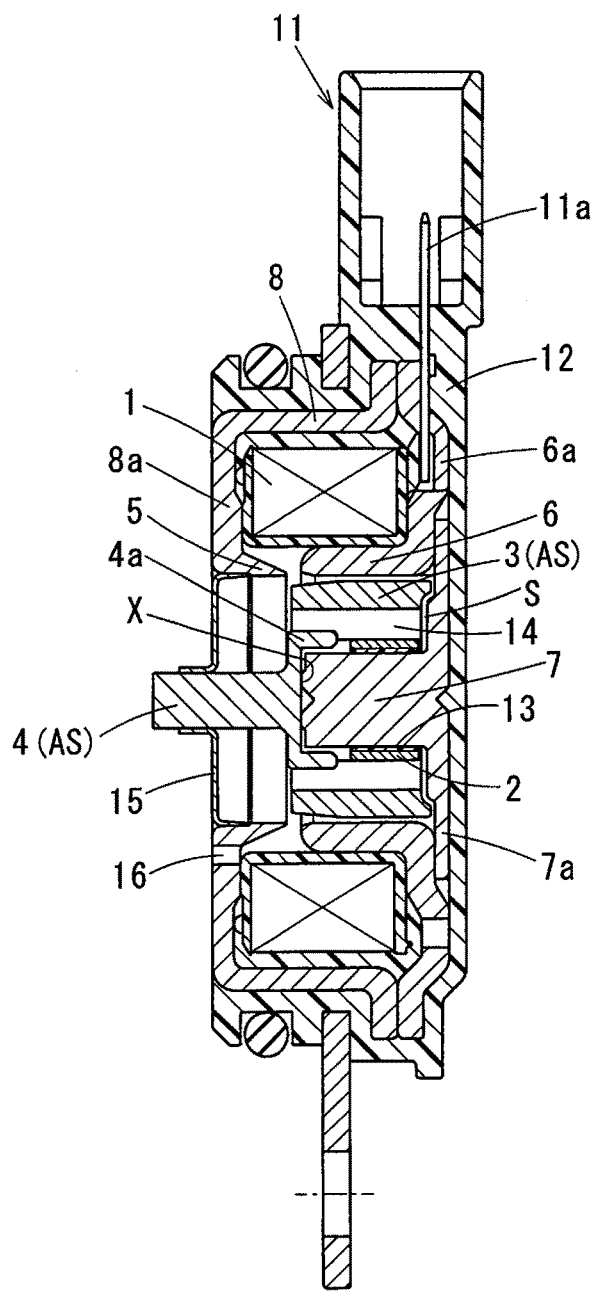
FIG. 1 is a sectional view illustrating a linear solenoid along its axial direction in accordance with a first embodiment.
Figure 2:
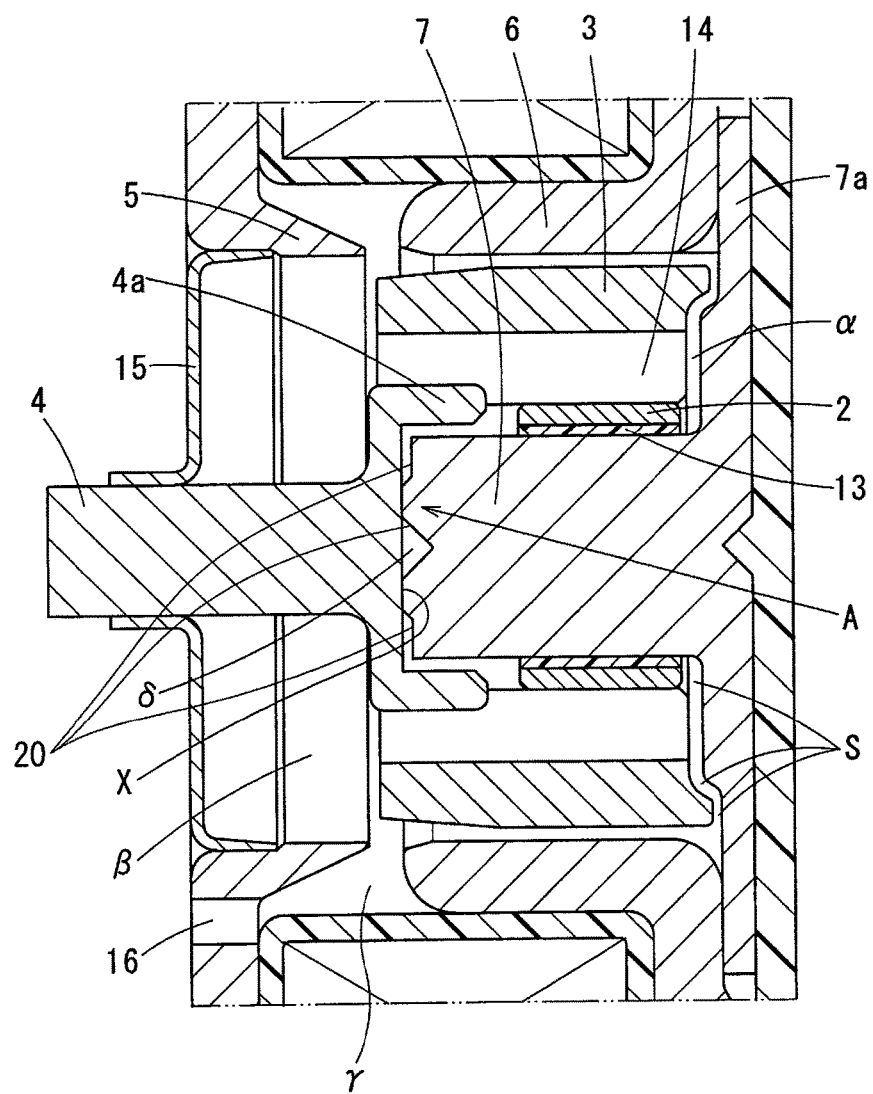
FIG. 2 is a sectional view illustrating a main part of the linear solenoid of the first embodiment.
Figure 3B:
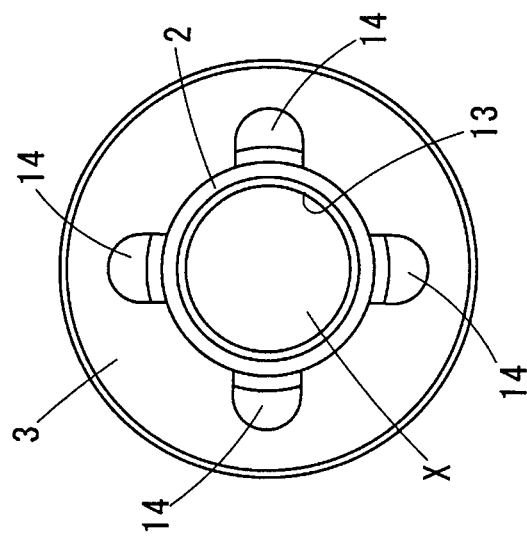
FIG. 3B is a diagram illustrating the plunger assy viewed from the other axial end-side in the first embodiment.
Figure 3A:
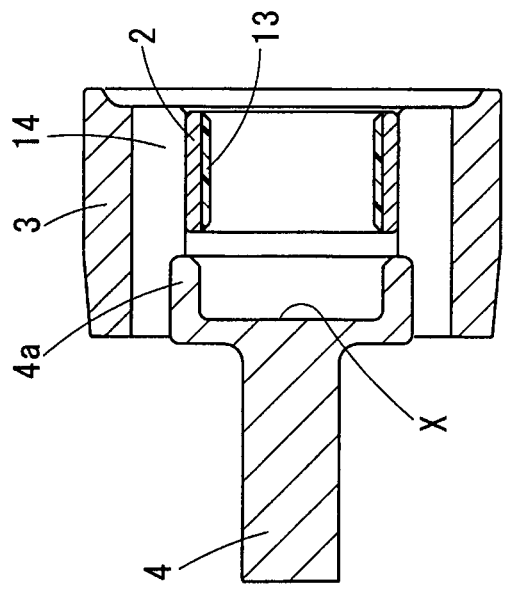
FIG. 3A is a sectional view illustrating a plunger assy along its axial direction according to the first embodiment.

Embodiments will be described below with reference to the accompanying drawings. The following embodiments illustrate one example among many, and the present disclosure is, needless to say, not limited to the embodiments.

First Embodiment

A first embodiment will be described with reference to FIGS. 1 to 4B. A linear solenoid produces driving force in the axial direction. As a specific example, the linear solenoid of this embodiment is used for a valve timing mechanism that is disposed in an engine for vehicle traveling.

The valve timing mechanism switches the supply destination of oil pressure to vary the advanced angle amount of a camshaft according to the axial driving force applied by the linear solenoid. The variation of the advanced angle amount of the camshaft to an advance side or to a retard side by the valve timing mechanism changes the valve timing of the engine.

The linear solenoid includes a coil 1 that produces magnetic force upon energization thereof, a plunger assy AS that is driven in the axial direction due to this magnetic force produced by the coil 1, and a stator through which the magnetic flux generated by the energization of the coil 1 flows.

The above-described plunger assy AS includes a plunger 3 inward of which a bushing 2 is provided, and an output member 4 that is fixed at one axial end of this plunger 3.

The above-described stator includes a magnetic attraction core 5 that magnetically attracts the plunger 3 in the axial direction due to the magnetic force produced by the coil 1, a cylindrical magnetic delivery core 6 that gives and receives the magnetic flux to and from the outer peripheral surface of the plunger 3, a columnar center core 7 that gives and receives the magnetic flux to and from the inner peripheral surface of the plunger 3, and a yoke 8 that covers the outer periphery of the coil 1.

The components of the above-described linear solenoid will be individually explained. One end side (first side) in the axial direction (i.e., left side in FIG. 1) is hereinafter referred to as "front," and the other end side (second side) in the axial direction (i.e., right side in FIG. 1) is hereinafter referred to as "rear." This front-rear direction is a direction for explanation, and does not limit the installation direction of the linear solenoid.

The coil 1 is obtained by winding a conductive wire, to which insulation coating is applied, many turns around a resin bobbin. The coil 1 produces the magnetic force upon energization thereof. The magnetic flux produced by the coil 1 forms a magnetic flux loop passing through the stator and the plunger 3.

The coil 1 is energized via a connector 11. The connector 11 is a connection device for electrically connecting to a control device, which performs variable control on the advanced angle amount of the camshaft, via a connecting wire. This connector 11 is formed by a part of a secondary molding resin 12 that molds the coil 1. A terminal 11a that is electrically connected to both ends of the coil 1 is disposed in the resin connector 11.

The plunger 3 is formed from magnetic material such as iron. The plunger 3 has a generally cylindrical shape, and is disposed inward of the magnetic delivery core 6 as well as outward of the center core 7. The size of the outer diameter of the plunger 3 is set to be slightly smaller than the size of the inner diameter of the magnetic delivery core 6. A minute clearance is accordingly formed between the plunger 3 and the magnetic delivery core 6 along the whole circumference. Thus, the plunger 3 and the magnetic delivery core 6 are provided not to be in direct contact with each other.

The bushing 2 functions as a part of the plungers 3, and is fixed to the inner periphery of the plungers 3 by press-fitting. The size of the inner diameter of the bushing 2 is set to be slightly larger than the size of the outer diameter of the center core 7, and a sliding clearance is formed between the bushing 2 and the center core 7. Thus, the bushing 2 is supported slidably on the outer peripheral surface of the center core 7. Consequently, the plunger 3 is supported slidably in the axial direction.

The bushing 2 is formed from magnetic material such as iron. A non-magnetic material layer 13 that is formed from non-magnetic material is provided on the inner peripheral surface of the bushing 2. The non-magnetic material layer 13 is formed on the inner peripheral surface of the bushing 2 by a coating technique or the like, and may be formed from resin material or from non-magnetic metal.

The plunger 3 includes a breathing passage 14 that communicates in the axial direction. The breathing passage 14 of this embodiment is provided by the grooves that are formed to extend in the axial direction on the inner peripheral surface of the plunger 3. The grooves are provided at regular intervals in the radial direction of the plunger 3 to prevent the deflection of magnetic flux. The above-described bushing 2 is provided on the inner diameter side of the groove. Thus, the magnetic flux is given and received between the plunger 3 and the center core 7 via the bushing 2.

The output member 4 transmits the displacement of the plunger 3 to the above-described valve timing mechanism, and is formed from non-magnetic material such as stainless steel. The output member 4 is a shaft having a columnar rod shape passing axially through the center of a cover 15 made of magnetic material that blocks the inside of the magnetic attraction core 5. A press-fit cylinder 4a that is press-fitted into the plunger 3 is provided integrally with the rear end of the output member 4.

The magnetic attraction core 5 is formed from a magnetic material such as iron. The magnetic attraction core 5 of this embodiment is provided integrally with the yoke 8, although this is not limiting. The rear end of the magnetic attraction core 5 is disposed with an axial clearance formed relative to the front end of the magnetic delivery core 6. When the plunger 3 is displaced toward the front side, the magnetic attraction core 5 overlaps with the outer peripheral surface of the front end of the plunger 3 in the axial direction. The outer peripheral surface of the magnetic attraction core 5 in a range that overlaps with the plunger 3 in the axial direction includes a tapered surface whose diameter reduces toward the rear side. This tapered surface is for making the magnetic attraction force applied to the plunger 3 remain unchanged even though the stroke amount of the plunger 3 changes.

The magnetic delivery core 6 is formed from a magnetic material such as iron. The magnetic delivery core 6 has a cylindrical shape that is inserted into the coil 1. A ring-shaped rear plate 6a that extends from the rear end of the delivery core 6 toward the outer diameter side is provided integrally with the magnetic delivery core 6 illustrated in this embodiment. The outer periphery of this rear plate 6a is magnetically coupled to the rear end of the yoke 8.

The center core 7 is formed from a magnetic material such as iron. The center core 7 has a columnar shape that extends in the front-rear direction at the central part of the coil 1. A flange part 7a is provided integrally with the rear end of the center core 7. The flange part 7a has a circular plate shape whose diameter increases toward the outer diameter side at the rear end of the center core 7. This flange part 7a is magnetically coupled to the magnetic delivery core 6, and fills the clearance between the rear end of the magnetic delivery core 6 and the rear end of the center core 7.

The yoke 8 is formed from a magnetic material such as iron. The yoke 8 has a cylindrical shape that covers the outer periphery of the coil 1. A ring-shaped front plate 8a whose diameter reduces from its front end toward the inner diameter side is provided integrally with the yoke 8 of this embodiment. The above-described magnetic attraction core 5 is formed at the inner end of this front plate 8a.

The volume change in the linear solenoid will be explained. As described above, the flange part 7a closes the clearance between the rear end of the magnetic delivery core 6 and the rear end of the center core 7. The space that is surrounded by the magnetic delivery core 6, the center core 7, the plunger 3, and the flange part 7a is a first space $\alpha$. The volume of the first space $\alpha$ needs to be changed to displace the plunger 3 in the axial direction. Thus, in this embodiment, the breathing passage 14 that communicates with the first space $\alpha$ is provided to enable the volume change of the first space $\alpha$.

The space inside the cover 15 is referred to as a second space $\beta$. The second space $\beta$ is a space that communicates with the front end of the above-described breathing passage 14. The volume of the second space $\beta$, in addition to the first space $\alpha$, needs to be changed to displace the plunger 3 in the axial direction.

The second space $\beta$ communicates with the space outward of the magnetic attraction core 5 as well as inward of the coil 1 through the clearance between the magnetic attraction core 5 and the magnetic delivery core 6. This space is referred to as a third space $\gamma$. The front plate 8a includes one or more through holes 16 for communicating between the third space $\gamma$ and the outside. The volume change of the second space $\beta$ can be made by this through hole 16.

The space that is formed inward of the press-fit cylinder 4a as well as between the front end of the center core 7 and the rear end of the output member 4 is referred to as a fourth space $\delta$. The volume of the fourth space $\delta$, in addition to the first space $\alpha$ and the second space $\beta$, needs to be changed to displace the plunger 3 in the axial direction.

The size of the inner diameter of the press-fit cylinder 4a is set to be larger than the size of the outer diameter of the center core 7. Thus, a clearance for breathing is formed between the press-fit cylinder 4a and the center core 7 in the radial direction. A clearance is also provided between the rear end of the press-fit cylinder 4a and the front end of the bearing part. By such a configuration, the fourth space $\delta$ communicates with the breathing passage 14. Consequently, the volume of the fourth space $\delta$ can be changed.

The output member 4 includes a contact part X that comes into contact with the front end of the center core 7 when the plunger 3 is displaced toward the rear side. The contact part X is provided inward of the press-fit cylinder 4a as well as on the rear end surface of the output member 4. The contact part X is brought into contact with the front end of the center core 7 to restrict the displacement of the plunger 3 toward the rear side.

The linear solenoid of this embodiment bring the contact part X into contact with the front end of the center core 7 to form an axial clearance S between the rear end of the plunger 3 and the flange part 7a. This clearance S will be explained below by calling it a rear end clearance. To describe a specific example for supplementing the understanding, the plunger 3 is configured not to be in contact with the flange part 7a by setting the size of the center core 7 in the axial direction to be slightly longer than the conventional art, or by setting the size of the plunger 3 in the axial direction to be slightly shorter than the conventional art.

The size of the rear end clearance S in the axial direction may be set to be short in a range that can restrain the sticking phenomenon described above as an example, although this is not limiting. To describe a specific example for supplementing the understanding, the rear end clearance S is set at approximately 0.2 mm to 2 mm. As a matter of course, this numerical value is a reference example, and is not limiting.

The rear end clearance S does not need to be even, and may have a difference in gap distance in the radial direction. A specific example that makes a difference in gap distance in the radial direction is illustrated in FIG. 1. In FIG. 1, the gap distance of the rear end clearance S is set to be large in a range near the breathing passage 14, and in contrast, the gap distance of the rear end clearance S is set to be small in an area distant from the breathing passage 14 (i.e., near the outer circumferential edge of the rear end clearance S).

A first effect of the first embodiment will be explained. As described above, when the plunger 3 moves from the front side to the rear side, the linear solenoid of the first embodiment brings the output member 4 into contact with the front end of the center core 7 to form the rear end clearance S between the plunger 3 and the flange part 7a. Consequently, there is no defect such as a part of the breathing passage 14 closed by the increased diameter part described in the conventional art, thus improving the responsiveness of the plunger 3.

In a state where the contact part X is in contact with the front end of the center core 7, the rear end clearance S is formed between the plunger 3 and the flange part 7a. This can eliminate the need for groove machining that is performed on the flange part 7a in the conventional art to limit the sticking phenomenon at the flange part 7a. In this manner, the linear solenoid of this first embodiment can eliminate the groove machining on the flange part 7a to improve the responsiveness of the plunger 3. In other words, the linear solenoid that is excellent in responsiveness can be provided at a low price.

A second effect of the first embodiment will be described. Issues will be explained first. If the magnetic material part of the bushing 2 or the plunger 3 is in contact with the flange part 7a unlike this first embodiment, great magnetic attraction force is generated at the contact part. This deteriorates the responsiveness of the plunger 3 when the plunger 3 starts to move. In this manner, if the bushing 2 or the plunger 3 is in contact with the flange part 7a, a non-magnetic layer needs to be formed at the contact part, thus causing cost increases. In this first embodiment, the plunger 3 including the bushing 2 is not in contact with the flange part 7a due to the rear end clearance S. Thus, the non-magnetic layer does not need to be formed at the contact part to reduce costs. Therefore, the linear solenoid that is excellent in responsiveness can be provided at a low price.

A third effect of the first embodiment will be described below. The plunger 3 of this first embodiment is supported slidably on the outer peripheral surface of the center core 7 through the bushing 2 that is fixed to the inside of the plunger 3. The bushing 2 has a simple cylindrical shape, and thus the accuracy of its inner peripheral surface can be improved relatively easily. Consequently, the inclination of the bushing 2 relative to the center core 7 can be prevented. This can improve the slidability of the plunger 3 to reduce the hysteresis of the plunger 3.

A fourth effect of the first embodiment will be described below. In this first embodiment, a shape change part A is provided at the front end of the center core 7. The shape change part A is a part of the center core 7 whose shape is changed to reduce the contact area between the contact part X and the center core 7. A specific example of the shape change part A includes at least one of one or more projecting parts swollen out in the axial direction, one or more recessed parts recessed in the axial direction, one or more streaky projections, or one or more grooves extending in the radial direction.

Figure 4B:
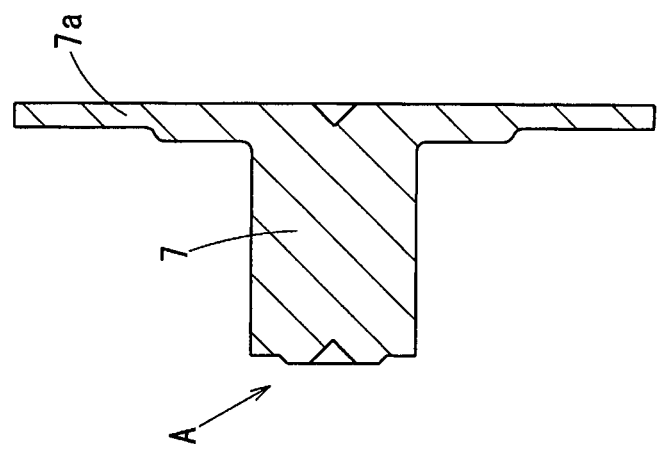
FIG. 4B is a sectional view illustrating the center core along its axial direction in the first embodiment.
Figure 4A:
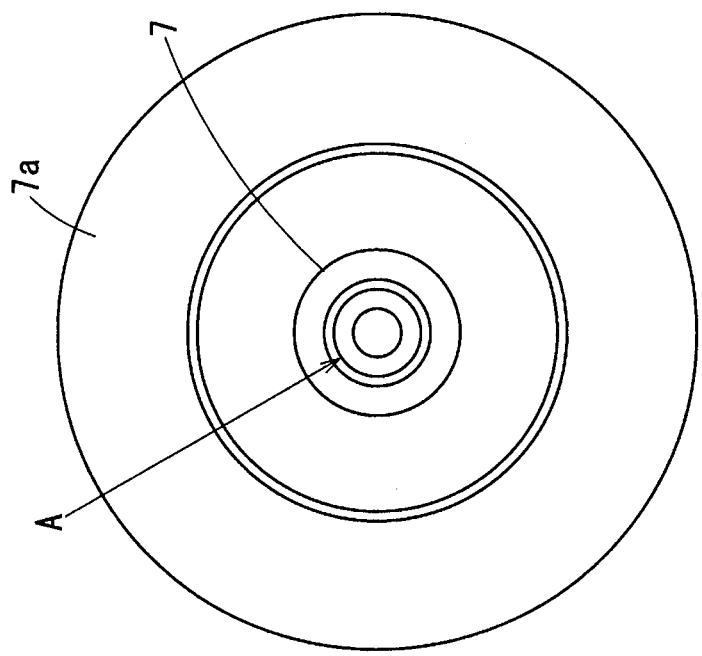
FIG. 4A is a diagram illustrating a center core viewed from one axial end-side in the first embodiment.

The shape change part A used in the first embodiment will be described. A modification different from the first embodiment will be explained later in a third embodiment. As illustrated in FIGS. 4A and 4B, the front end of the center core 7 includes the shape change part A, which is a combination of a projecting part that is swollen out to the front side, and a recessed part that is recessed to the rear side. With regard to the shapes of the projecting part and the recessed part, in one instance in this embodiment, the shape of the projecting part that is viewed from the axial direction is circular, and the recessed part has a conical shape, although this is obviously not limiting. More specifically, the outer peripheral surface of the projecting part is formed to have a tapered surface whose diameter reduces toward the front side.

Providing the shape change part A by forming recessed portions 20 at the front end of the center core 7 can reduce the contact area between the contact part X and the center core 7. The sticking phenomenon between the contact part X and the center core 7 can accordingly be restricted. Consequently, the responsiveness of the plunger 3 can further be improved.

Second Embodiment

A second embodiment will be described with reference to FIGS. 5A to 6E. In the following embodiments, the same reference numerals as in the above first embodiment indicate their corresponding functional objects. Only modified parts to the first embodiment will be explained below, and the precedingly-described embodiment is employed for the parts not described in the second embodiment.

Figure 5E:
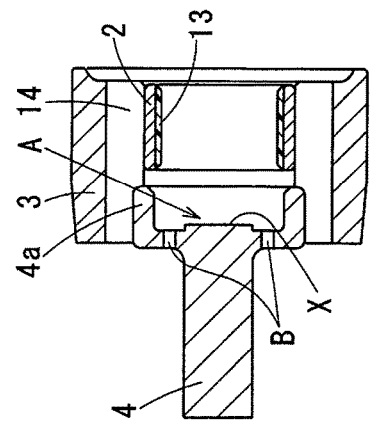
FIG. 5E is a sectional view illustrating the plunger assy along its axial direction in which through holes are provided for an output member according to the second embodiment.
Figure 5B:
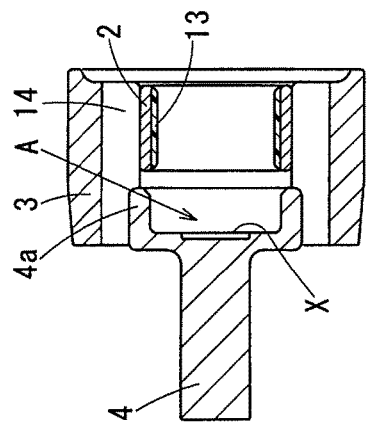
FIG. 5B is a sectional view illustrating the plunger assy along its axial direction in which the shape change part is a recessed part with a linear bottom part according to the second embodiment.
Figure 5D:
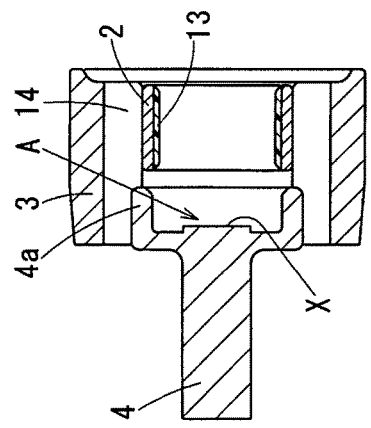
FIG. 5D is a sectional view illustrating the plunger assy along its axial direction in which the shape change part is a projecting part having a linear top portion according to the second embodiment.
Figure 5A:
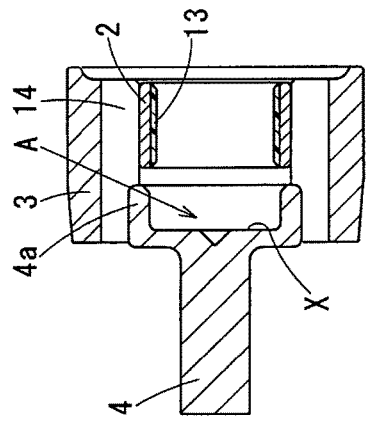
FIG. 5A is a sectional view illustrating a plunger assy along its axial direction in which a shape change part is a conical recessed part in accordance with a second embodiment.
Figure 5C:
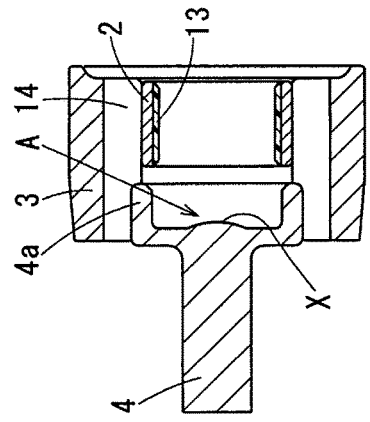
FIG. 5C is a sectional view illustrating the plunger assy along its axial direction in which the shape change part is a projecting part swollen-out in a spherical surface shape according to the second embodiment.

A first characteristic art of the second embodiment will be described. This second embodiment provides a shape change part A at a contact part X. The shape of the shape change part A that is provided at the contact part X is not limited, and can be variously modified as illustrated in FIGS. 5A to 6E, for example. A specific example of the shape change part A that is provided at the contact part X will be explained. As illustrated in FIG. 5A, the shape change part A may be a conical recessed part. As illustrated in FIG. 5B, the shape change part A may be a recessed part with a linear bottom part. As illustrated in FIG. 5C, the shape change part A may be a projecting part that is swollen out in a spherical surface shape. As illustrated in FIG. 5D, the shape change part A may be a projecting part having a linear top portion.

As illustrated in FIG. 6A, the shape change part A may be a projecting part or a recessed part whose shape viewed from the axial direction is circular. As illustrated in FIG. 6B, the shape change part A may be grooves whose shapes viewed from the axial direction spread radially from the center to the outer diameter side, or streaky projections that spread radially from the center to the outer diameter side. As illustrated in FIG. 6C, the shape of the shape change part A viewed from the axial direction may be a groove or a streaky projection. As illustrated in FIG. 6D, the shape of the shape change part A viewed from the axial direction may be a groove intersecting in a cross shape or a plus-shaped projecting part intersecting in a cross shape.

Providing the shape change part A at the contact part X can produce a similar effect to the fourth effect of the first embodiment.

A second characteristic art of the second embodiment will be described. As illustrated in FIGS. 5E and 6E, an output member 4 of this second embodiment includes one or more through holes B that communicate between a fourth space δ and a second space β. This through hole B is formed by axially passing through the part that joins together the rear end of the output member 4 and the front end of a press-fit cylinder 4a. Providing this through hole B can more easily change the volume of the fourth space δ. Consequently, the responsiveness of a plunger 3 can further be improved.

The formation of the through hole B may create burrs at the rear end of the through hole B. Thus, the art for providing the shape change part A is combined with the art for providing the through hole B. This can make burrs non-contact. Specifically, providing the shape change part A having a projecting shape at the contact part X or at the front end of a center core 7 can make the rear end of the through hole B non-contact with the center core 7. In this manner, even though some burrs are created at the through hole B, the burrs are not in contact with the other members. Consequently, the deburring process or the like after the through hole B is formed can be rendered unnecessary. This can restrain the formation cost of the through hole B, thus providing the linear solenoid with improved responsiveness by the through hole B at a low price.

Third Embodiment

Figure 7A:
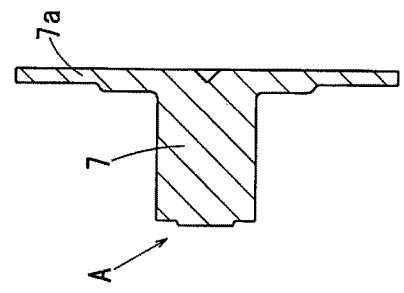
FIG. 7A is a sectional view illustrating a center core along its axial direction in a reference example when the shape change part is not provided at a front end of the center core in the second embodiment.

The third embodiment will be described with reference to FIGS. 7A to 8F. This third embodiment illustrates modifications to the shape change part A that is provided at the front end of the center core 7. FIGS. 7A and 8A are reference examples when the shape change part A is not provided at the front end of the center core 7, and are used in employing the above second embodiment.

Figure 7C:
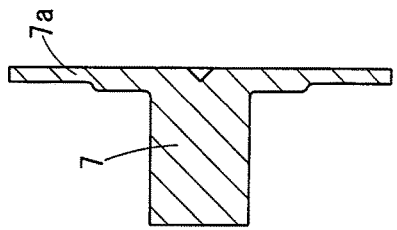
FIG. 7C is a sectional view illustrating the center core along its axial direction in which the shape change part is a recessed part having a linear bottom part according to the third embodiment.
Figure 7B:
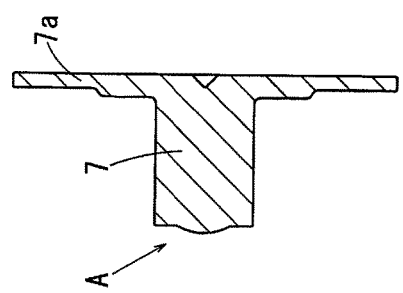
FIG. 7B is a sectional view illustrating a center core along its axial direction in which a shape change part is a projecting part having a linear top portion in accordance with a third embodiment.
Figure 7D:
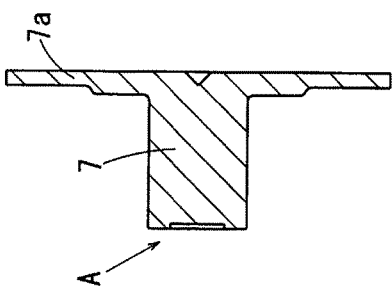
FIG. 7D is a sectional view illustrating the center core along its axial direction in which the shape change part is a projecting part swollen-out in a spherical surface shape according to the third embodiment.

A specific example of the shape change part A that is provided at the front end of the center core 7 will be described. As illustrated in FIG. 7B, the shape change part A may be a projecting part having a linear top portion. As illustrated in FIG. 7C, the shape change part A may be a recessed part having a linear bottom portion. As illustrated in FIG. 7D, the shape change part A may be a projecting part that is swollen out in a spherical surface shape.

As illustrated in FIG. 8B, the shape of the shape change part A viewed from the axial direction may be a groove or a streaky projection. As illustrated in FIG. 8C, the shape change part A may include a projecting part whose shape viewed from the axial direction is circular, and a minus-shaped groove may be formed at this projecting part. As illustrated in FIG. 8D, the shape of the shape change part A viewed from the axial direction may be a circular recessed part or a circular projecting part. As illustrated in FIG. 8E, the shape of the shape change part A viewed from the axial direction may be a groove intersecting in a cross shape or a plus-shaped projecting part intersecting in a cross shape. As illustrated in FIG. 8F, the shape change part A may include a projecting part whose shape viewed from the axial direction is circular, and a plus-shaped groove may be formed at this projecting part.

Modifications to the above embodiments will be described. The above embodiments illustrate the example of the groove provided on the inner peripheral surface of the plunger 3 as a means for forming the breathing passage 14, but the means for forming the breathing passage 14 is not limited to this example. As a specific example, a groove extending in the axial direction may be provided on the outer peripheral surface of the plunger 3, or a hole passing axially through the plunger 3 may be provided.

The above embodiments illustrate the example of the bushing 2 provided inward of the plunger 3, but this example is not limiting. Specifically, the non-magnetic material layer 13 may be formed directly on the inner peripheral surface of the plunger 3, and the inner peripheral surface of the plunger 3 slides directly on the outer peripheral surface of the center core 7.

The above embodiments apply the present disclosure to the linear solenoid that gives axial force to the valve timing mechanism, but this does not limit the intended use of the linear solenoid.

Characteristics of the linear solenoid of the above embodiments can be described as follows.

The output member 4 is brought into contact with one end of the center core 7 so that the plunger 3 and the flange part 7a are not in contact with each other. Thus, the output member 4 is brought into contact with one end of the center core 7 to form the axial clearance S between the plunger 3 and the flange part 7a. This can eliminate defects such as the blockage of a part of the breathing passage 14 with the increased diameter part, thus improving the responsiveness of the plunger 3. The formation of the axial clearance S between the plunger 3 and the flange part 7a can eliminate the need for the groove machining on the flange part 7a for limiting the sticking phenomenon. Thus, the groove machining on the flange part 7a can be eliminated to improve the responsiveness of the plunger 3. In other words, the linear solenoid that is excellent in responsiveness can be provided at a low price.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A linear solenoid comprising:
   a coil that produces magnetic force upon energization thereof;
   a cylindrical plunger that is supported movably in an axial direction of the cylindrical plunger inward of the coil and that includes a breathing passage, which communicates in the axial direction;

an output member that is fixed at an end of the plunger on a first side in the axial direction;

a magnetic attraction core that magnetically attracts the plunger in the axial direction due to the magnetic force produced by the coil;

a cylindrical magnetic delivery core that gives and receives magnetic flux to and from an outer peripheral surface of the plunger, respectively;

a columnar center core that gives and receives the magnetic flux to and from an inner peripheral surface of the plunger, respectively; and a flange part that is provided at an end of the center core on a second side in the axial direction, wherein:

the second side is an opposite side from the first side in the axial direction;

a radius of the flange part extends away from an outer surface of the center core;

the flange part closes a space between an end of the magnetic delivery core on the second side in the axial direction and the end of the center core on the second side in the axial direction;

the output member includes a contact part, which is brought into contact with an end of the center core on the first side in the axial direction when the plunger moves toward the second side in the axial direction; and when the contact part is brought into contact with the end of the center core on the first side in the axial direction, the plunger defines an axial clearance between the plunger and the flange part so that the plunger is not in contact with the flange part.

2. The linear solenoid according to claim 1, further comprising a bushing that is fixed inward of the plunger and that is supported slidably on an outer peripheral surface of the center core, wherein the bushing has a cylindrical shape.

3. The linear solenoid according to claim 2, wherein when the contact part is brought into contact with the end of the center core on the first side in the axial direction, the bushing is not in contact with the flange part.

4. The linear solenoid according to claim 1, wherein the contact part includes a shape change part that reduces a contact area between the contact part and the center core when the contact part and the center core are in contact with each other.

5. The linear solenoid according to claim 1, wherein the end of the center core on the first side in the axial direction includes a shape change part that reduces a contact area between the end of the center core on the first side in the axial direction and the contact part when the end of the center core on the first side in the axial direction and the contact part are in contact with each other.

* * * * *